United States Patent [19]
Dinh et al.

[11] Patent Number: 5,574,667
[45] Date of Patent: Nov. 12, 1996

[54] TEMPERATURE INDEPENDENT FAN-ERROR CORRECTION CIRCUIT

[75] Inventors: James S. Dinh, Spring; George K. Korinsky, The Woodlands, both of Tex.

[73] Assignee: Compaq Computer Corporation, Houston, Tex.

[21] Appl. No.: 457,039

[22] Filed: Jun. 1, 1995

Related U.S. Application Data

[63] Continuation of Ser. No. 76,466, Jun. 14, 1993, Pat. No. 5,526,289.
[51] Int. Cl.$^6$ ................................ H02H 7/08; H05K 7/20
[52] U.S. Cl. ............................ 364/557; 361/1; 361/23; 361/695; 395/750
[58] Field of Search .................... 364/480, 481, 364/483, 707, 556, 557, 708.1; 361/1, 6, 23–25, 687, 688, 694, 695; 395/750

[56] References Cited

U.S. PATENT DOCUMENTS

| | | | |
|---|---|---|---|
| 4,088,869 | 5/1978 | Nopanen | 219/364 |
| 4,267,500 | 5/1981 | Bourke et al. | 318/806 |
| 4,722,669 | 2/1988 | Kundert | 417/32 |
| 5,249,741 | 10/1993 | Bistline et al. | 236/49.3 |
| 5,287,009 | 2/1994 | Heung | 307/141 |
| 5,287,244 | 2/1994 | Hileman et al. | 361/687 |

FOREIGN PATENT DOCUMENTS

92/22863   6/1992   WIPO .

Primary Examiner—James P. Trammell
Assistant Examiner—Edward Pipala
Attorney, Agent, or Firm—L. Jon Lindsay; Charles B. Meyer

[57] ABSTRACT

A computer system has control circuitry for detecting directly and independently of temperature the malfunctioning of a fan used for cooling the housing of the computer and for controlling the power supply voltage when malfunctions are detected so as to reduce the temperature within the housing of the computer system.

6 Claims, 2 Drawing Sheets

TEMPERATURE INDEPENDENT FAN-ERROR CORRECTION CIRCUIT

This is a continuation of application Ser. No. 08/076,466 filed on Jun. 14, 1993, now U.S. Pat. No. 5,526,289.

BACKGROUND OF THE INVENTION

The invention relates to computer systems with cooling subsystems for cooling of heat producing elements within the computer. More particularly, the invention relates to fan cooling subsystems as used in many personal computers today. Even more particularly, the invention relates to fan cooling subsystems for personal computer systems wherein the speed of the fan is adjusted based on the temperature within the personal computer system housing.

Many computer systems today, and nearly all desktop personal computers, use a fan cooling subsystem to cool off the heat producing elements within the computer. These fans are generally situated in an opening in the computer housing, and may direct air into or out of the housing. In most computer systems, the fan blows at a constant speed.

A very rapidly spinning fan exchanges the air in the box quickly, so when the load inside a computer is producing a lot of heat, its fan needs to spin very rapidly, but when the load elements are producing only a little heat, the fan may spin more slowly.

A rapidly spinning fan makes considerably more noise than a slowly spinning fan. Thus, there is a trade off between the speed with which heat may be dissipated by a fan and the noise produced by the fan. Therefore, some computer makers have found it desirable to provide two speeds for their fans. When the computer's elements are operating at a low temperature, the fan blows quietly at a low speed. When the computer's elements are hot, however, the system blows rapidly and loudly. Thus, sound quality is sacrificed only when high temperatures make a high fan speed necessary.

The two-speed fan subsystem has certain problems. When the temperature inside the computer is at an intermediate level, the slow speed of the fan cannot cool the system, and the high speed of the fan is unnecessarily loud. Thus, the two-speed fan subsystem proves inefficient in such circumstances. A three-speed fan subsystem would provide an intermediate fan speed, but would unnecessarily complicate the fan control circuitry.

Thus, there is a need for a fan subsystem which can increase the fan speed proportionally to the increase in the temperature of the computer's elements. Such a fan subsystem would evenly match the temperature inside the computer with the fan speed necessary to cool the system. Thus, a computer system with such a fan subsystem would provide the most efficient trade off between fan speed and sound quality.

Additionally, if the temperature inside the computer gets too hot, then the fan may not be able to cool the system even at the high speed of a two-speed fan subsystem. In this case, the computer system will overheat and possibly damage some of the computer's elements. Likewise, if the fan is missing or becomes blocked and unable to spin, then there will be no airflow to the heat producing elements, so the system may overheat in this situation, too. Therefore, there is a need for a fan subsystem with control circuitry which can protect against overheating due to inadequate fan speed, a missing fan, or a blocked fan.

SUMMARY OF THE INVENTION

A computer system according to the present invention changes the speed of its fan proportionally to the change in temperature inside the computer housing. Additionally, the system includes circuitry for protecting the computer system against overheating.

Control circuitry for controlling the operation of the fan subsystem includes a thermistor for sensing the temperature within the housing of the computer system. As the temperature changes, the resistance of the thermistor changes. The thermistor has relatively low resistance at high temperatures and relatively high resistance at low temperatures.

The thermistor performs as a voltage divider with the fan and other circuit elements. Thus, as the temperature increases, the voltage across the thermistor decreases, and the voltage across the fan increases, so the fan spins faster. The change in voltage across the fan is substantially proportional to the change in the temperature of the thermistor.

The control circuitry also includes protection circuitry for protecting the system against overheating. When the temperature becomes very high or the fan is missing or the fan is unable to turn, then the protection circuitry sends a signal to the power supply of the system to shut off the power.

BRIEF DESCRIPTION OF THE DRAWINGS

A better understanding of the invention can be had when the following detailed description of the preferred embodiment is considered in conjunction with the following drawings, in which.

DETAILED DESCRIPTION OF THE PREFERRED EMBODIMENT

Figure 1:
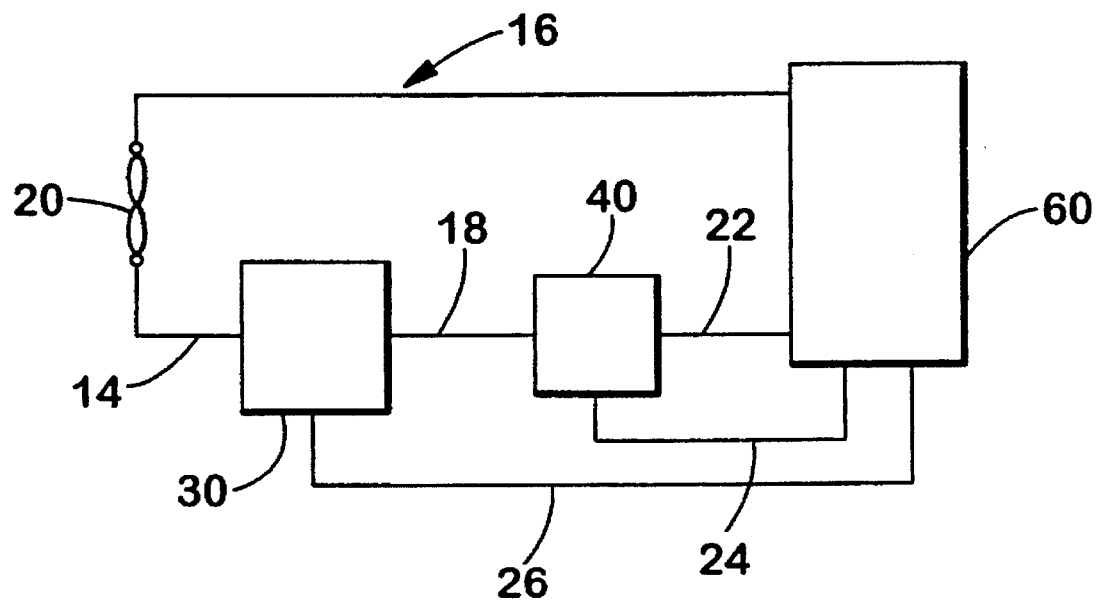
FIG. 1 is a block diagram of the fan control circuitry for use in a personal computer system incorporating the present invention.

A fan control circuit for use in a computer system as in the present invention is shown in FIG. 1. A high voltage is applied to the fan 20 across wire 16 from the power supply 60. In the preferred embodiment, this high voltage is approximately +12 V. A low voltage is applied to the opposite terminal of the fan across wire 14. This low voltage is connects from the power supply 60 at wire 26 across voltage control circuit 30 to wire 14. In the preferred embodiment, this low voltage is approximately −5 V.

Protection circuit 40 is connected to the voltage control circuit 30 through wire 18. An intermediate voltage source is applied to the protection circuit 40 at wire 22 from the power supply 60. A return wire 24 connects the protection circuit 40 to the power supply 60. In the preferred embodiment, the intermediate voltage source is approximately +5 V and the return wire 24 connects to a reference voltage or secondary ground of the power supply 60.

Figure 2:
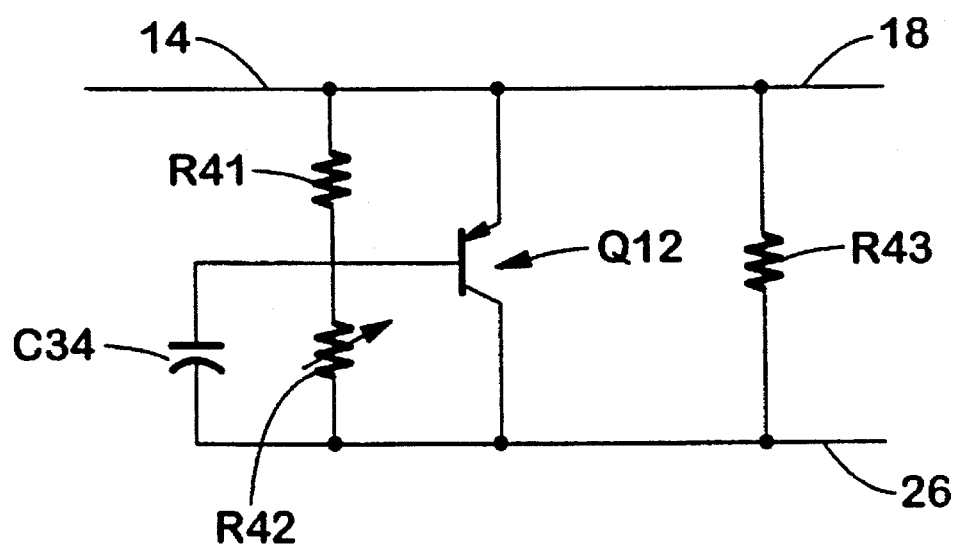
FIG. 2 is a schematic diagram of the voltage control circuitry for use in the fan control circuitry of a computer system incorporating the present invention.

FIG. 2 shows the voltage control circuitry 30 incorporated in the present invention. Wire 14 connects the emitter terminal of transistor Q12 to the fan 20. Wire 26 connects the low voltage from the power supply 60 to the collector terminal of transistor Q12. Resistor R41 connects across the base-emitter (b-e) junction of the transistor Q12. Thermistor R42 connects across the base-collector junction of the transistor Q12. Capacitor C34 connects in parallel with thermistor R42. Resistor R43 connects across the emitter and collector of transistor Q12. Wire 18 connects the emitter terminal of transistor Q12 to the protection circuit 40.

Figure 3:
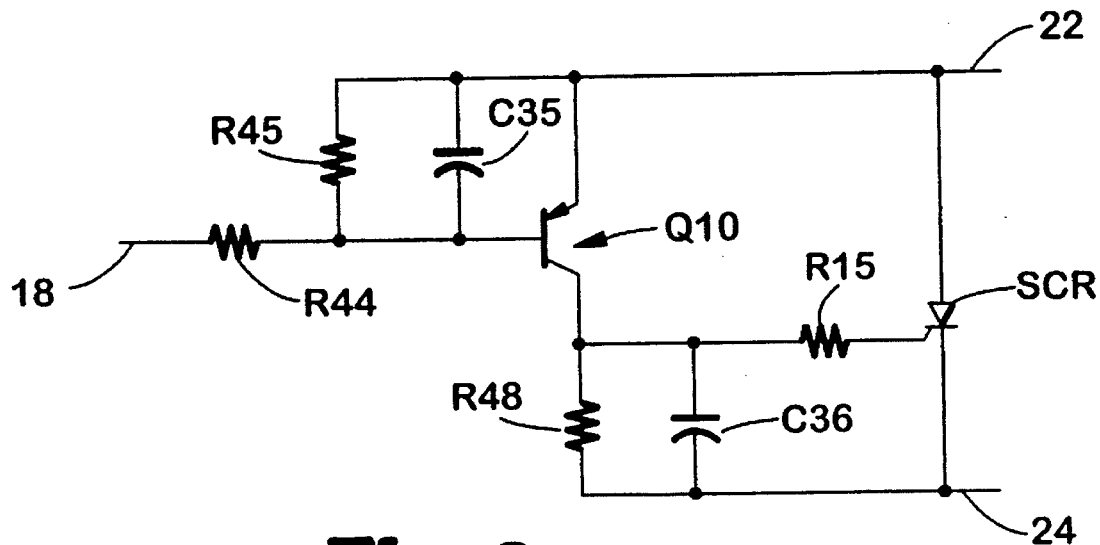
FIG. 3 is a schematic diagram of the protection circuitry for use in the fan control circuitry of a computer system incorporating the present invention.

FIG. 3 shows the protection circuitry 40 incorporated in the present invention. The intermediate source from the power supply 60 is applied to wire 22. A silicon control rectifier SCR connects wire 22 to the return wire 24. Wire 22 connects to the emitter of transistor Q10. Resistor R15 connects the collector of transistor Q10 to the silicon control rectifier SCR. Resistor R48 connects the collector of transistor Q10 to the return wire 24. Capacitor C36 is placed in parallel with resistor R48. Resistor R45 is placed across the emitter-base junction of transistor Q10. Capacitor C35 is placed in parallel with resistor R45. Resistor R44 connects the base of transistor Q10 to wire 18, and thus to the voltage control circuit 30.

The voltage drop across the b-e junction of transistor Q12 in FIG. 2 clamps the voltage across resistor R41. Thus, a constant current flows through resistor R41.

A thermistor is a resistor with high resistance at low temperatures and low resistance at high temperatures. Thus, at approximately room temperature, thermistor R42 has a high resistance relative to resistor R41. The current through resistor R41 also flows through thermistor R42. This current causes a large voltage drop across thermistor R42, so the voltage drop from wire 14 to the low voltage source on wire 26 is relatively large. Therefore, by the voltage divider rule, the voltage across the fan is relatively small. In the preferred embodiment, the voltage across the fan 20 at room temperature is between 5 V and 7 V.

As the temperature of thermistor R42 rises, the resistance of thermistor R42 decreases. Thus, the current flowing from resistor R41 causes a small voltage drop across thermistor R42, so the voltage drop from wire 14 to the low voltage source on wire 26 is relatively small. Therefore, according to the voltage divider rule, the voltage across the fan is relatively large. In the preferred embodiment, the voltage across the fan 20 is approximately 11 to 13 volts when the temperature of thermistor R42 reaches approximately 50 degrees Celsius.

Figure 4:
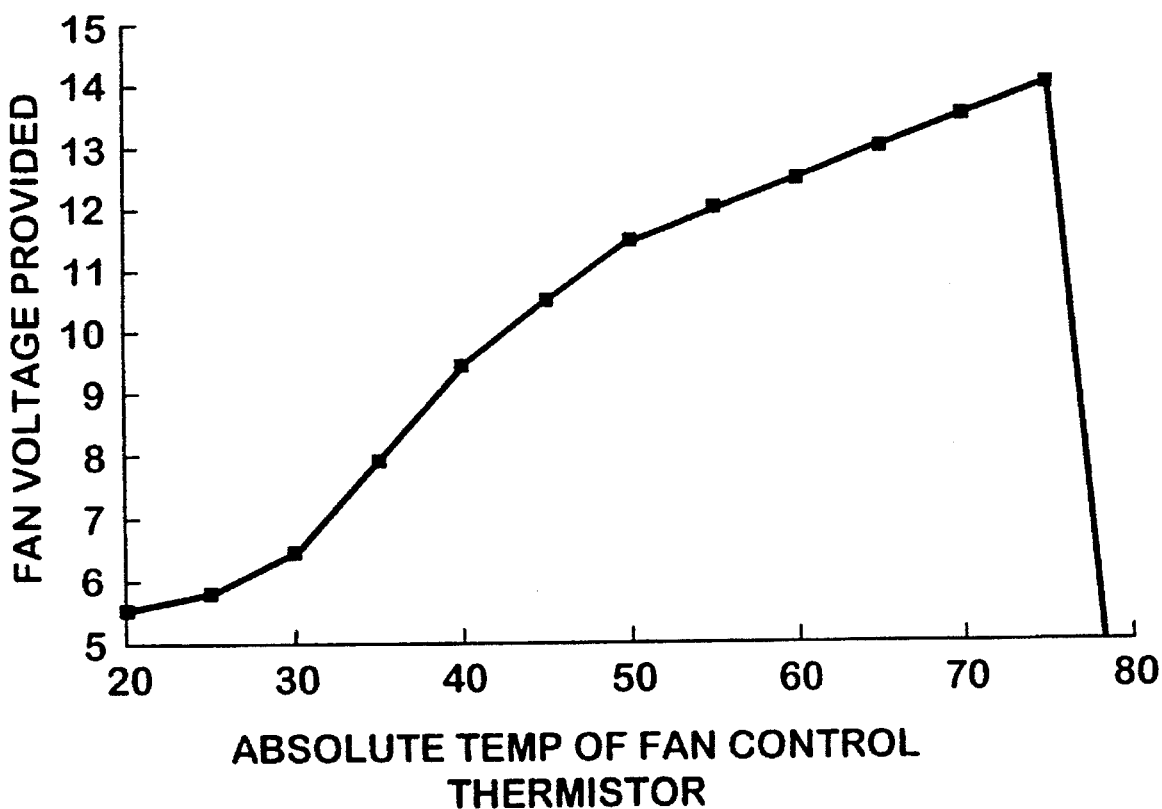
FIG. 4 is a graph of the voltage provided to the fan vs. temperature.

The voltage across the fan 20 is approximated as a continuous function of the temperature of thermistor R42. FIG. 4 shows a graphical representation of the relationship of the voltage provided to the fan versus the temperature of the thermistor. This relationship approximates a linear curve in the range of 30 to 50 degrees Celsius, wherein the system is most often operated. Outside of this range, the system may still be operated, but the relationship between the voltage and the temperature is not linear.

The invention incorporates an overheating protection mechanism by turning the protection circuit 40 on. As the temperature of thermistor R42 becomes hotter, its resistance goes very low until the voltage across the base-connector (b-c) junction of transistor Q12 becomes low enough to turn transistor Q12 on. Thus, the potential of wire 18 is driven very low by the low voltage source on wire 26. The low potential on wire 18 causes transistor Q10 to turn on sending a current through resistor R15 to silicon control rectifier SCR. The current to silicon control rectifier SCR turns on silicon control rectifier SCR, effectively shorting the intermediate voltage source on wire 22 to return wire 24. Thus, the protection circuit 40 is on, and the intermediate voltage source, through return wire 24, sends a signal to the power supply 60 to shut off.

Likewise, the invention incorporates a mechanism to shut off the power supply 60 in the event the fan 20 is missing. The open circuit across wire 16 and wire 14 allows the low voltage source on wire 26 to draw wire 18 to a low voltage. The low voltage on wire 18 causes the protection circuit 40 to turn on as in the overheating protection mechanism described above. Thus, the intermediate voltage source is effectively shorted to the return wire 24, sending a signal to the power supply 60 to shut off.

In the event the fan becomes locked, unable to rotate, the protection circuit 40 again shuts off the power supply. In a locked-fan situation, the current through the fan 20 is very low. Therefore, the voltage drop from wire 14 to wire 26 is very small. Thus, as in the overheating case above, the low voltage source on wire 26 draws the voltage on wire 18 very low and turns on the protection circuit 40. The resulting effective short of the intermediate voltage source to the return wire 24 provides a signal to the power supply 60 to shut off.

The fan 20 is capable of operating at the low voltage described above under stable conditions. However, at the initial power-up of the system, fan 20 requires a high voltage signal to begin rotating. As fan 20 speeds up, the voltage can be turned down to the stable condition. Therefore, time delays are built into the system to provide an initial high voltage to fan 20 at start-up.

Capacitor C34 creates a short across thermistor R42 at the initial power-up. Thus, the voltage drop from wire 14 to the low voltage source on wire 26 is small, and the voltage across fan 20 is large. In the preferred embodiment, this initial voltage across fan 20 is in the range of 14 to 17 volts.

The time delay created by capacitor C34 and resistor R41 causes the short across thermistor R42 at initial power-up to decay to its stable state condition. At initial power-up, the temperature of thermistor R42 usually starts low. Therefore, thermistor R42 starts at a high resistance, so the stable state condition of thermistor R42 results in a high voltage drop across thermistor R42 and a relatively low voltage drop across the fan 20.

Contrary to the overheating case and the missing fan case described above, the low voltage drop between wire 14 and wire 26 does not cause transistor Q10 to turn on at the initial power-up. Instead, capacitor C35 and resistor R44 cause a second time delay, which is longer than the above described delay. The effective short across the b-e junction of transistor Q10 caused by capacitor C35 clamps the voltage to the intermediate voltage on wire 22, so transistor Q10 cannot turn on. The stable state condition results in a voltage drop across resistor R45. Since the delay caused by capacitor C35 and resistor R44 is longer than the delay caused by capacitor C34 and resistor R41, the voltage on wire 14 has time to become stable before the voltage drop across resistor R45 would allow transistor Q10 to turn on. Thus, protection circuit 40 does not send a signal to turn off power supply 60 at the initial power-up.

Capacitor C36 provides a high frequency filter to protect silicon control rectifier SCR. Capacitor C36 prevents any high voltage spike from reaching silicon control rectifier SCR.

Thus it can be seen that the present invention provides for a computer system with a temperature dependent fan control circuit which provides for an approximately linear relationship between the temperature inside the computer and the voltage provided to the fan and additional features to protect against overheating.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

What is claimed is:

1. A computer system having a housing, a fan and a power supply for applying a voltage to the fan and electrical power to the computer system comprising:

a fan control circuit electrically coupled to the fan for adjusting the voltage applied to the fan, the fan control circuit producing at least one fan-error signal when the fan control circuit detects one or more fan operational errors, wherein each fan operational error is detected independently of temperature within the housing; and protection circuitry electrically coupled to the power supply and the fan control circuit for receiving each fan-error signal and for sending a power-off signal to the power supply thereby commanding the power supply to turn off the electrical power to the electrical equipment upon receipt of at least one fan-error signal.

2. The computer system of claim 1 wherein the computer system is a personal computer system.

3. The computer system of claim 1 wherein at least one fan operational error is a locked condition preventing the fan from turning and at least one fan-error signal represents such locked condition.

4. The computer system of claim 3 wherein the computer system is a personal computer system.

5. The computer system of claim 1 wherein one of the at least one fan operational errors is an open circuit condition preventing the power supply from applying the voltage to the fan and at least one of the fan-error signals represents the open circuit condition.

6. The computer system of claim 5 wherein the computer system is a personal computer system.

* * * * *